United States Patent [19]
Olson et al.

[11] Patent Number: 5,982,395
[45] Date of Patent: Nov. 9, 1999

[54] METHOD AND APPARATUS FOR PARALLEL ADDRESSING OF AN IMAGE PROCESSING MEMORY

[75] Inventors: Steven J. Olson, Portland; Robert C. Hinz, West Linn; Kurt M. Anderson, Molalla, all of Oreg.

[73] Assignee: Cognex Corporation, Natick, Mass.

[21] Appl. No.: 09/002,055

[22] Filed: Dec. 31, 1997

[51] Int. Cl.[6] .................................................. G09G 5/36
[52] U.S. Cl. ........................................ 345/515; 345/508
[58] Field of Search .................................. 345/501, 508, 345/515, 517, 507, 509, 505

[56] References Cited

U.S. PATENT DOCUMENTS

| | | | |
|---|---|---|---|
| 4,208,721 | 6/1980 | Eisenberg | 708/442 |
| 4,493,105 | 1/1985 | Beall et al. | 382/197 |
| 4,648,045 | 3/1987 | Demetrescu | 345/509 |
| 4,674,861 | 6/1987 | Kawamura | 382/167 |
| 4,850,028 | 7/1989 | Kawamura et al. | 382/296 |
| 4,860,375 | 8/1989 | McCubbrey et al. | 382/303 |
| 4,916,640 | 4/1990 | Gasperi et al. | 382/291 |
| 4,922,543 | 5/1990 | Ahlbom et al. | 382/291 |
| 4,967,392 | 10/1990 | Werner et al. | 345/505 |
| 5,115,309 | 5/1992 | Hang | 348/388 |
| 5,134,272 | 7/1992 | Tsuchiya et al. | 382/184 |
| 5,146,340 | 9/1992 | Dickerson et al. | 348/345 |
| 5,153,925 | 10/1992 | Tanioka et al. | 382/272 |
| 5,253,308 | 10/1993 | Johnson | 382/304 |
| 5,297,256 | 3/1994 | Wolstenholme et al. | 702/183 |
| 5,315,388 | 5/1994 | Shen et al. | 348/718 |
| 5,347,595 | 9/1994 | Bokser | 382/225 |
| 5,357,606 | 10/1994 | Adams | 345/508 |
| 5,502,775 | 3/1996 | Takeo | 382/169 |
| 5,657,403 | 8/1997 | Wolff et al. | 382/302 |
| 5,758,043 | 5/1998 | Takizawa et al. | 395/115 |

*Primary Examiner*—Kee M. Tung
*Attorney, Agent, or Firm*—William A. Loginov; Russ Weinzimmer

[57] ABSTRACT

A method and apparatus for addressing a parallel image processing memory provides a plurality of random access memories arranged in an array in a set of array rows and array columns. Each of the memories has addresses for storing image pixel data that are arranged identically to each other. Each of the random access memories stores the group of image pixel data at the identical addresses. The entire group of image pixel data is stored in each of the plurality of random access memories. The random access memories can be constructed from a plurality of individual random access memory structures that are joined as a single memory storage unit, or buffer that enables one image pixel data to be addressed in each addressing cycle. An image processor generates address values for accessing the group of image pixel data over a plurality of address lines interconnected with respective of the plurality of buffers. The image processor manipulates the group of image pixel data. In particular, the image processor accesses each of a plurality of different image pixel data from the group in each of the plurality of buffers, respectively. The pixel data in each of the plurality of buffers can have a different preprocess operation performed to it prior to storage in a respective of the plurality of buffers.

14 Claims, 4 Drawing Sheets

METHOD AND APPARATUS FOR PARALLEL ADDRESSING OF AN IMAGE PROCESSING MEMORY

FIELD OF THE INVENTION

This invention relates to the processing of image data stored in a plurality of parallel random access memories (RAMs) and more particularly to a method and apparatus for accessing multiple copies of the image data, each copy stored in a separate RAM buffer.

BACKGROUND OF THE INVENTION

In machine vision applications, it is common to acquire image data related to the surface of a workpiece and to store this data for further processing. Stored image data is used for pattern-recognition, error detection and other surface inspection applications. FIG. 1 details a basic image processing arrangement according to the prior art. A camera 30 having a lens 32 for acquiring an image and an electro-optical pickup device, such as a CCD array 34, transmits image data over a data line 36 to a memory device 38. The memory device in this example comprises a random access memory (RAM) configured to receive image data. Data is typically provided in digital form, often following conversion from an analog form by a analog to digital converter (not shown) located in the data path between the CCD array and the image RAM 38. Image data is stored in the image RAM 38 as individual pixels that each represent a given segment of the overall image. Each pixel represents a relatively small part of the total image, such that in aggregate, the image appears relatively continuous. Each pixel has a discrete intensity value that defines a brightness and, when applicable, a shade of color. Where the image is acquired and recorded in color, a pixel may be formed from at least three different-color sub-pixels that form the overall color shade. Alternatively, where the image is monochromatic, a numerical grayscale intensity value is recorded for the pixel. As described further below, the RAM is organized as a series of rows and columns, each individually addressed by an incoming data line. By addressing the appropriate row and column, all or part of a particular pixel intensity value can be accessed and read. An image processor 40 that can incorporate any acceptable microprocessor or application specific integrated circuit (ASIC) retrieves intensity values as data over a multi-bit data line 42 based upon input pixel addresses transmitted over a multi-bit address line 44. Model or "template" image data, representative of an image to be compared to the acquired image, can be input to the processor through a variety of input lines denoted generally as the input line 48. The processor matches the model data to the acquired data stored in the RAM 38. The processor, using known techniques, calculates an overall match of the acquired data with the model image data by combining the results of each individual pixel-by-pixel match performed by the processor. Results of matches made by the processor are output on an output line 50 to other processors or computers. These processors utilize the output data to perform more advanced operations such as overall pattern recognition.

In another example, the processor can acquire several pixels over the RAM data line 42 that are adjacent each other and, based upon these adjacent pixels, derive modified pixel values (such as average values for all pixels in a group) that are output on the output line 50. These values can be returned through a return line 52 (shown in phantom) to the RAM 38 for restorage. Appropriate addressing functions provided by the processor 40 can facilitate storage of the modified pixel values in the appropriate locations in the RAM.

The image processing arrangement of FIG. 1 enables pixel data to be accessed in the RAM in a largely serial manner. That is, only one pixel data can be read from the RAM to the processor in each addressing cycle. Some microprocessor arrangements such as the well-known Pentium® MMX® microprocessor available from Intel Corp. can access several pixel data simultaneously. For example the forenamed microprocessor uses a single address to access eight sequential eight-bit pixel data in one clock cycle. However, this arrangement has a limitation in that it requires all pixels data to be stored adjacent to each other in the RAM. Hence, to process a group of pixels widely spaced in two dimensions of an image, or at remote spacings from each other, the processor must address pixel data over several clock cycles. This slows the image processing procedure. Speed is a concern in a high-speed machine vision environment in which a large volume of data must be managed by the processing system continuously.

It is, therefore, an object of this invention to provide a high-speed method and apparatus for accessing multiple pixels in an image processing memory array.

SUMMARY OF THE INVENTION

This invention overcomes disadvantages of the prior art by providing parallel access by an image processor to a set of image memory devices each having a similar or identical set of image pixel data stored therein at similar or identical memory addresses without requiring the image processor to independently address each of the memory devices. In particular, a grouping of identical pixel data are stored at identical addresses in each of the memories. In other words, the same pixel data can be accessed in each memory by applying the same address to each memory. In this manner the processor can retrieve a large grouping of pixels at once from the memory array by transferring a different pixel of the grouping. In particular the processor can address a different pixel data from each memory device in the set by applying a different address to each memory device. The entire grouping of pixel data can be transferred to the processor in one address cycle. The size of the grouping that can be transferred at once depends upon the number of discrete memory devices used in the set, since one discrete pixel data is transferred from each device in each addressing cycle. This arrangement operates at high speed due to the large number of pixel data substantially simultaneously transferred between the processor and the memory.

In a preferred embodiment, a method and apparatus for addressing a parallel image processing memory provides a plurality of random access memories (RAMs) arranged in an array in a set of array rows and array columns. Each of the RAMs has addresses for storing image pixel data that are arranged identically to each other. Each of the RAMs stores the group of image pixel data at the identical addresses. The entire group of image pixel data is stored in each of the plurality of RAMs. The random access memories can be constructed from a plurality of individual random access memory structures that are joined as a single memory storage unit (a "buffer") that enables one image pixel data to be addressed in each addressing cycle. An image processor generates address values for accessing the group of image pixel data over a plurality of address lines interconnected with respective of the plurality of buffers. The image processor manipulates the group of image pixel data. In particular, the image processor accesses each of a plurality of different image pixel data from the group in each of the plurality of buffers, respectively.

According to a preferred embodiment, the memory array includes twelve buffers each constructed of two 512K-byte RAMs arranged in a ten-bit-by-ten-bit row and column address arrangement. Nine lower-order column bits are interconnected with the column address lines of each of the two RAMs that comprise the buffer. The highest order column address bit is connected with a chip select input on each of the RAMs, to enable the addressed data from either of the RAMs to be selectively transferred to the image processor.

According to one embodiment, the pixel data in each of the plurality of buffers can have a different preprocess operation performed to it prior to storage in a respective of the plurality of buffers.

BRIEF DESCRIPTION OF THE DRAWINGS

The foregoing and other objects and advantages of the invention will become more clear with reference to the following detailed description as illustrated by the drawings in which.

DETAILED DESCRIPTION

Figure 1:
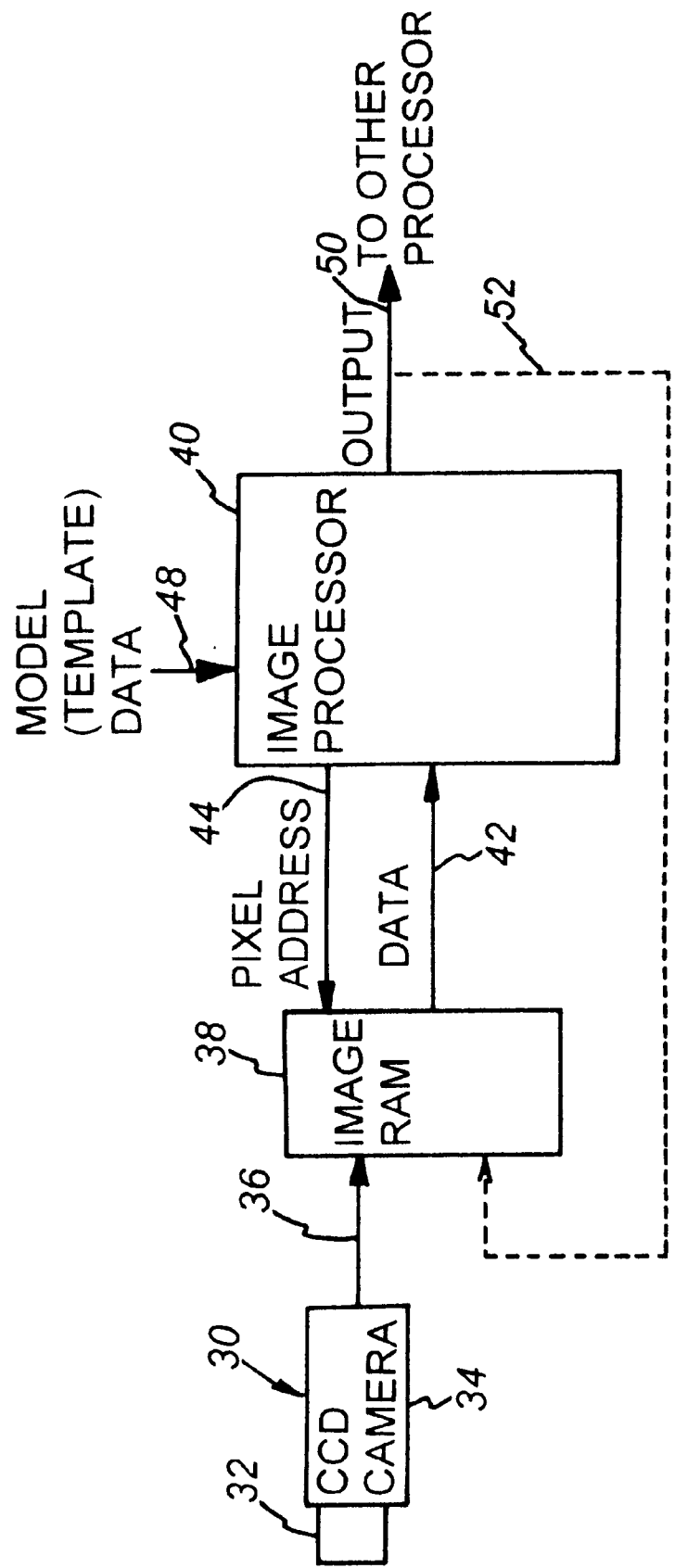
FIG. 1, previously described, is a block diagram of an image processing system according to the prior art.
Figure 2:
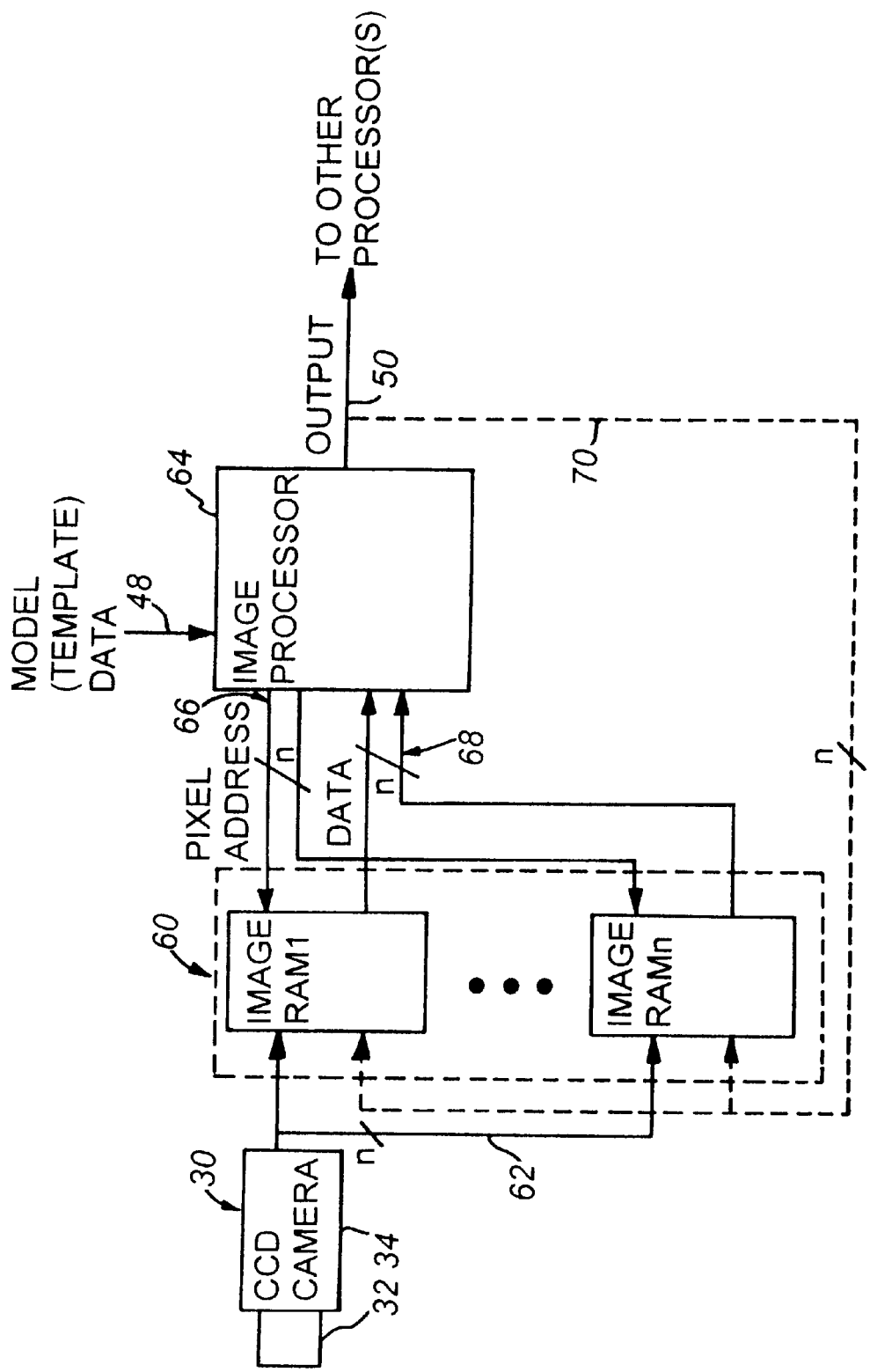
FIG. 2 is a block diagram of an image processing system including parallel storage of image data enabling higher processing speed according to an embodiment of this invention.

FIG. 2, shows an image processing system according to a generalized embodiment of this invention. In general, the image processing system according to this invention receives image signals from a camera, such as the CCD camera element, as shown in FIG. 1. Likewise, the system of this invention outputs processed data to other processors and is controlled based upon control and data signals of other processors, as shown in FIG. 1.

In this embodiment, multiple image RAM devices are arranged as an overall memory array 60. Multiple discrete RAMs denoted RAM1 to RAMn are arranged in parallel. Each RAM in this example receives the same set of pixel data from the CCD camera 30. Image data is transmitted from the CCD camera element 34 directly to the memory array 60 over a series of data lines 62. The data lines, numbering n, are arranged in a parallel multi-bit configuration, preferably, or they can be arranged for serial transmission of image data. The image data is provided as a series of individual pixel data having shade and/or color values expressed as a digital number. In a preferred embodiment, each pixel data is eight bits wide, calling for n eight-bit data lines between the camera and the memory array. Pixel data is deposited in each of the RAMs (RAM1–RAMn) at the same time, in identical addresses within the RAMs according to a preferred embodiment. Writing of pixel data into the RAMs is controlled by the addressing functions of the Image processor 64 according to this embodiment.

The image processor 64 addresses the series of RAM devices using n multi-bit address lines 66. Likewise pixel data is transferred between the image processor and the memory array RAMs (RAM 1–RAMn) over n multiple-bit data lines 68. In particular, the arrangement of FIG. 2 enables n pixels to be read simultaneously by the processor 64. The parallel RAM arrangement enables dramatically increased processing speed by providing parallel access to multiple pixels during each processing step. In other words, the image processor 64 is arranged to receive a specific pixel data substantially simultaneously from each of the RAMs (RAM1–RAMn) in each clock/addressing cycle. Each pixel data can be different, meaning that n-RAMs can simultaneously provide the processor 64 with n data points from an overall image. In this embodiment, the separate addressing of each different RAM in the array enables the processor 64 to read pixels from different—even unrelated—parts of the image during the same clock/addressing cycle. This read pixel data is then processed by the image processor 64 in the manner described above, with reference to FIG. 1. That is, template data can be introduced to the image processor 64 by the line 48 for pattern recognition or, alternatively, pixels can be reprocessed and returned over n data lines 70 to each of the RAMs (RAM 1–RAMn). Processed data is output over the output line 50 to other processors for further advanced image processing.

Figure 3:
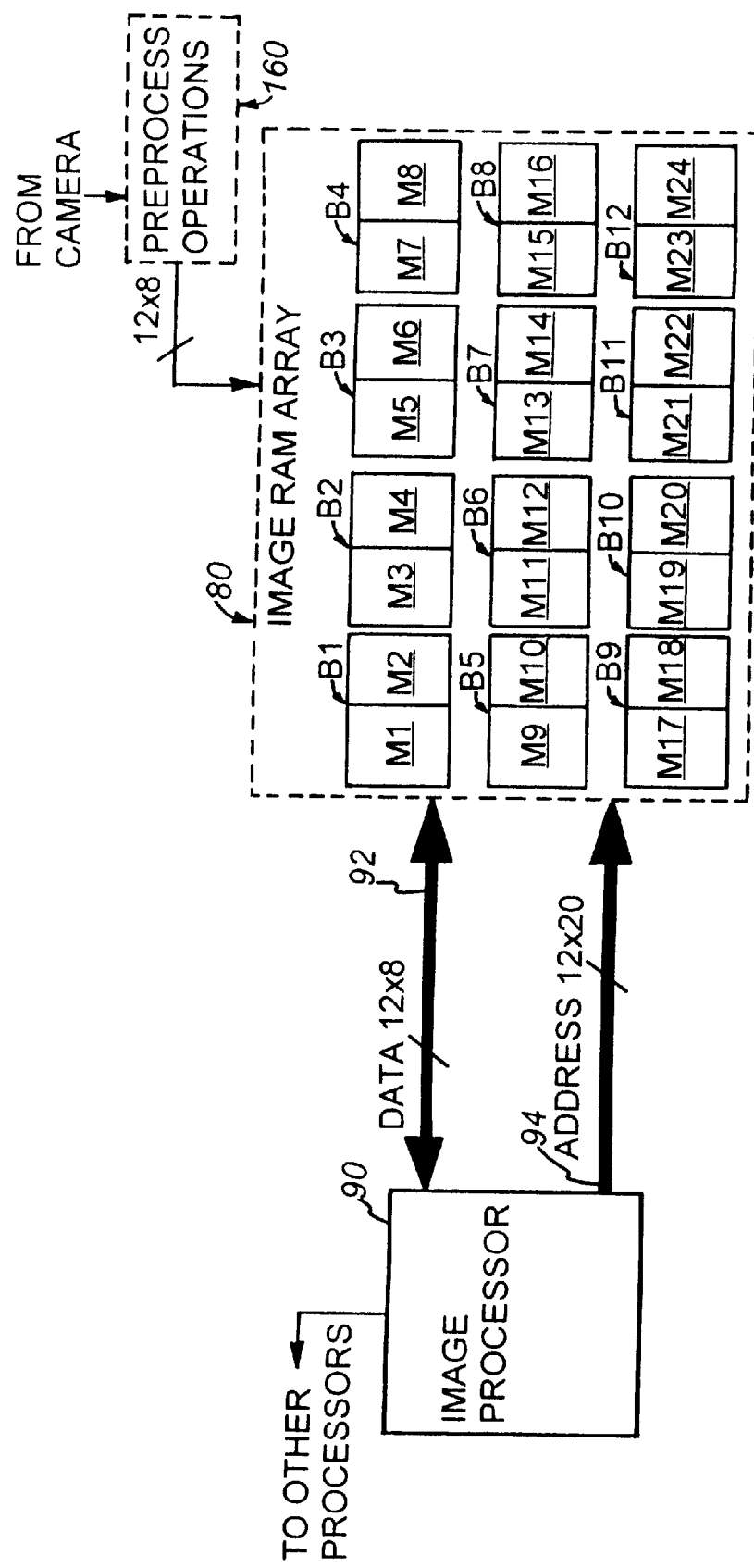
FIG. 3 is a block diagram detailing an exemplary image processing system having a plurality of parallel image RAMs according to a preferred embodiment of this invention.

FIG. 3 details a preferred embodiment of an array 80 of parallel random access memories RAMs according to this invention. The RAMs are conventional in internal configuration, and are arranged as twelve pairs B1, B2–B12 of discrete RAMs M1 and M2, M3 and M4 to M23 and M24, respectively. Each pair forms an independent image buffer comprising two 512K-byte RAM devices in this example. Each buffer allows storage of a similar or identical copy of the same set of image pixel data from the CCD camera element. Overall, twenty-four RAM devices M1–M24 are employed in an array the comprises three horizontal "array rows" each having four buffers. The buffers define four vertical "array columns" of three buffers, each. Although not shown in detail, each individual RAM in the buffer pair consists of an individual array of well-known, conventional RAM storage rows and columns that define the addresses of discrete storage cells. Each storage cell is configures to store one image pixel data. Each cell is accessed to read data from or write data to the cell by applying the particular RAM row and column address over the row and column address lines that extend from the processor. These row and column address lines are shown in aggregate as the twelve twenty-bit address line grouping 94 in FIG. 3. Typically, each twenty-bit address line comprises a separate ten-bit row and ten-bit column address line interconnected to each buffer B1–B12.

Figure 4:
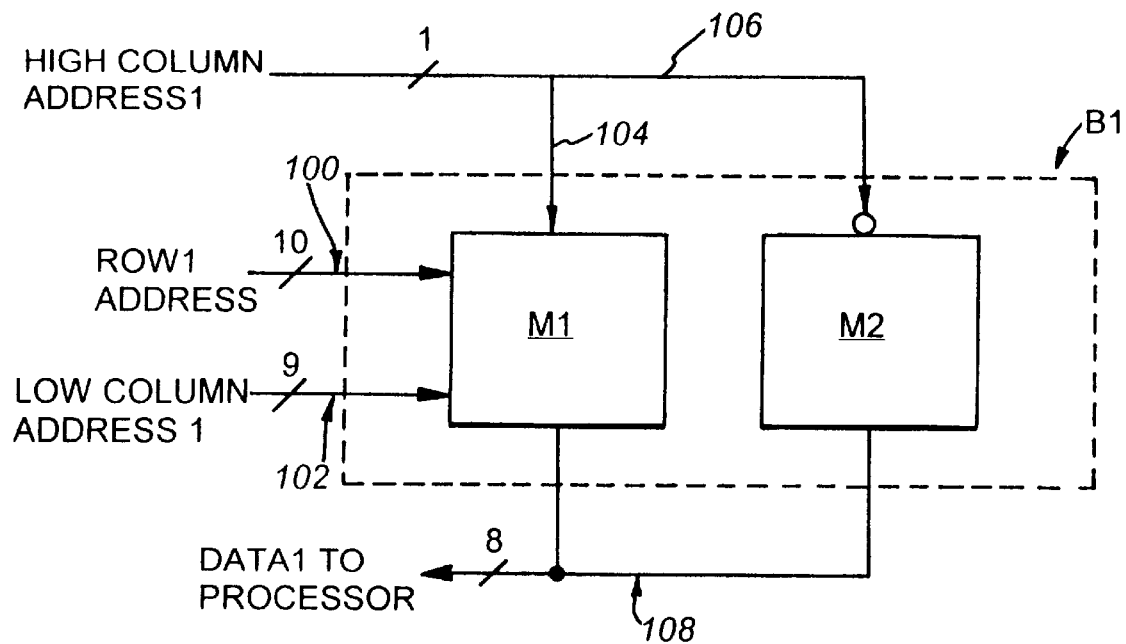
FIG. 4 is a block diagram of a random access memory buffer pair according to the embodiment detailed in FIG. 3.

Typically, the two discrete RAMs of each buffer B1–B12 comprise the high and low memory locations of a total memory space of over one-megabyte. As described, the address for each buffer B1–B12 is twenty bits wide. FIG. 4 further details the data and address interconnections for the buffer pair B1, which is typical of all buffer pairs in the memory array 80. A ten-bit row address line 100 is interconnected to each of the two RAMs M1 and M2 in the buffer B1. The RAMs M1 and M2 each receive the signal ROW ADDRESS1 from the processor, accessing the specified row in each of the two RAMs M1 and M2. The nine lower-order bits of the ten-bit column address signal from the processor are provided to the column address inputs of each RAM M1 and M2 as the signal LOW COLUMN ADDRESS1 on a nine-bit address line 102. The selected column in each RAM M1 and M2 is accessed. Selection between the RAMs M1 and M2 is made, lest both RAMs transmit pixel data from the selected row and column. Note that the pixel data stored in each RAM M1 and M2 are different, representing a different part of the total image. To differentiate between the two RAMs M1 and M2, which each have a nine-bit column address structure, the highest order column address bit is separated from the remaining nine bits. The signal HIGH COLUMN ADDRESS1 is transmitted to each RAM M1 and M2, where it is received by M2 in inverted form relative to M1. Each RAM M1 and M2 uses HIGH COLUMN ADDRESS1 as a chip select function on the respective chip select input lines 104 and 106. Depending upon whether the signal is at logical "high" or "low," either M1 or M2 exclusively is allowed to transmit its pixel data to the processor. In this manner, two 512K byte RAMs can operate as a single memory buffer having, over one-megabyte of storage capacity. Thus, despite the use of two RAMs M1 and M2, the processor only accesses one storage cell of the overall buffer B1 in each addressing cycle. The pixel data DATA1 read from either RAM M1 or M2 is transferred over the eight-bit data line 108.

According to this signal processing arrangement, the image processor 90, which comprises a custom ASIC or field programmable gate array (FPGA), can simultaneously access twelve different (possibly non-contiguous) pixels from the same image by addressing a different pixel in each of the twelve buffers B1–B12. The design of the image processor can be conventional insofar as the processing of image data is concerned. To address multiple pixels from the array, the image processor can employ otherwise well-known address-generation procedures. These procedures are carried on in parallel to access pixel data in each of the buffers in the memory within the same clock/addressing cycle.

Data is transferred between the image processor 90 and the RAM array 80 over the multi-bit data line 92 that comprises twelve individual eight-bit data lines each linked with a separate buffer. The number of bits in each data line depends largely upon the size of each pixel value. This number can vary. To access locations in each buffer for read and write operations over the data lines 92, the processor 90 transfers address values to each of the twelve buffers over the address lines 94.

Figure 5:
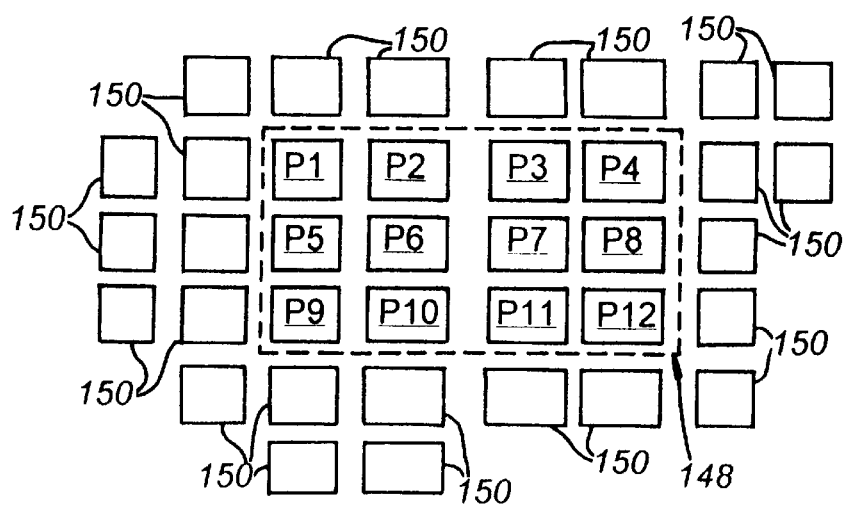
FIG. 5 is an exemplary grouping of adjacent pixels to be processed according to an embodiment of this invention.

The operation of the image processing system to access a grouping of pixel data stored in the memory array will now be further described. FIG. 5 depicts a portion of an image defined by individual pixels 150. A typical grouping 148 of adjacent pixels has been selected to be processed within a larger field of pixels 150. As noted previously, each pixel is defined by an intensity value (and/or, where applicable, a color shade) that is expressed as a digital data value at an appropriate address in the each of the parallel buffers B1–B12. The grouping 148 comprises twelve adjacent pixels in this embodiment denoted P1–P12. Twelve pixels are grouped so that each pixel P1–P12 can be concurrently addressed in one of the twelve buffers B1–B12. It is expressly contemplated that the number and arrangement of grouped pixels can be varied. In addition, pixels need not be adjacent to each other. For the purposes of this example it is assumed that the processor addresses pixel P1 in buffer B1, P2 in B2, P3 in B3, etc.

By way of example, the processor can read the pixel data of pixels P1–P12 as a single group by generating twelve concurrent RAM row and column addresses. The processor is preprogrammed via a system memory with the known address locations for the pixel data P1–P12 of the grouping 148. The twelve address values for the grouping are transmitted to each of the twelve respective buffers B1–B12.

Note that the storage address can vary from buffer to buffer in an alternate embodiment. The processor should be programmed to account for any difference in storage of the image in each specific buffer. For example, addresses in one buffer may be offset relative to the addresses in another buffer. If so, the offset amount should be programmed into the processor so that it can accurately pinpoint the correct pixel data in both buffers.

When each of the twelve addresses are generated by the processor at once (in one cycle), they each access a different pixel from the grouping 148—one pixel data in each respective buffer. In a basic operation, all pixel data are identical, and each address accesses a different pixel data from the overall grouping. The processor can process all read pixel data (the entire grouping of twelve pixels) at once. According to an alternate embodiment, the same pixel data can be accessed from two or more of the buffers in the memory array. This may be desirable if each buffer stores a different version of the same image data. For example, FIG. 3 shows an optional functional block 160 that denotes preprocessing operations performed on the acquired image input from the camera. The signal transmitted to the memory array, can be preprocessed on a buffer-by-buffer basis. The image data transmitted to each buffer may be different from that transmitted to the other buffers. For example, buffer B1 can receive data that is smoothed by a Gaussian or other function, while buffer B2 can receive data smoothed by a different function, or not at all. The data in each buffer is therefore a "version" of the image data originally acquired by the camera. The pixels may be located at the same address locations or near these locations, but their actual data values may vary depending upon the form of preprocess operation applied to each buffer input. Likewise, the processor can be arranged to account for differences in data entering from different buffers. For example, data entering the processor from B1 can be used for vertical edge detection while data entering from B2 can be used for horizontal edge detection. Such a variable use of stored data is expressly contemplated.

The foregoing has been a detailed description of a preferred embodiment of the invention. Various modifications and additions can be made without departing from the spirit and scope of this invention. For example the size of the array of buffers and the configuration of array rows and array columns of buffers can be varied to accommodate differently sized and shaped groups of pixels. Any of the embodiments described herein can be combined in whole or part with any other embodiments described herein. Data from a plurality of cameras can be provided to the memory array, and, as stated, different versions of the data can be loaded from the camera(s) into the different buffers of the memory array. Finally, the pairs of RAMs that constitute individual buffers can be substituted for a single RAM device having sufficient storage capabilities. Alternatively one or more larger RAM device(s) having a plurality of discrete buffer sections contained therein can be used to store multiple copies of the image. The sections should be individually addressable to enable transfer of a plurality of image pixel data therefrom during one addressing cycle. Accordingly, this description is meant to be taken only by way of example and not to otherwise limit the scope of the invention.

What is claimed is:

1. A system for processing a group of image pixel data that respectively define an image composed of a two dimensional array of respective image intensity values and corresponding locations within the image, the system comprising:

a plurality of random access memories, each of the memories having addresses that are arranged identically to each other, each of the random access memories storing the group of image pixel data at the identical addresses, wherein each of the addresses is constructed and arranged to store an image pixel data of the group of image pixel data, wherein each group of image pixel data stored in each of the plurality of random access memories represents identical intensity values and identical corresponding locations for defining the image; and an image processor that generates address values for accessing the group of image pixel data over a plurality of address lines interconnected with respective of the plurality of random access memories, the image processor being constructed and arranged to manipulate the group of image pixel data, the image processor further being constructed and arranged to concurrently access each of a plurality of different image pixel data from the group in each of the plurality of random access memories, respectively.

2. The system as set forth in claim 1 wherein the plurality of random access memories is equal in number to the plurality of different image pixel data in the group of image pixel data, and wherein the image processor is constructed and arranged to access each of the different image pixel data from a respective of the plurality of random access memories.

3. The system as set forth in claim 2 wherein the group of image pixel data corresponds to a group of contiguous pixels in an image representing a complete two-dimensional intensity array of the image.

4. The system as set forth in claim 1 wherein the image processor includes an input for model image data, the model image data being compared to the group of image pixel data.

5. The system as set forth in claim 1 wherein the plurality of random access memories each comprise a pair of random access memory structures each interconnected to a single common data line and each interconnected to a single common address line.

6. The system as set forth in claim 5 wherein the single common address line includes a chip select bit line interconnected with a chip select input on each of the random access memory structures of the pair.

7. The system as set forth in claim 6 wherein the chip select bit line comprises a highest order column address bit line.

8. The system as set forth in claim 7 further comprising a data line interconnected between an image acquisition camera and each of the pairs of random access memory structures, and a preprocessing structure that provides image pixel data having predetermined preprocess operations performed thereto to each of the pairs.

9. The system as set forth in claim 1 wherein image pixels corresponding to the group image pixel data together define a grid of image pixels being three image pixels by four image pixels in size.

10. The system as set forth in claim 9 wherein the plurality of random access memories are arranged in an array having three random access memories by four random access memories, whereby each pixel in the grid can be accessed by the processor by addressing a corresponding random access memory of the random access memories in the array.

11. A method for processing a group of image pixel data that respectively define an image composed of a two dimensional array of respective image intensity values and corresponding locations within the image, the method comprising:

establishing a plurality of random access memories, each of the memories having addresses that are arranged identically to each other, storing, in each of the random access memories, the group of image pixel data at the identical addresses, including storing, in each of the addresses, an image pixel data of the group of image pixel data wherein each group of image pixel data stored in each of the plurality of random access memories represents identical intensity values and identical corresponding locations for defining the image;

generating address values for accessing the group of image pixel data over a plurality of address lines interconnected with respective of the plurality of random access memories;

manipulating, with an image processor, the group of image pixel data; and accessing, concurrently with the image processor, each of a plurality of different image pixel data from the group of image pixel data in each of the plurality of random access memories, respectively.

12. The method as set forth in claim 11 wherein the step of accessing includes retrieving from each of the plurality of random access memories a specific, different image pixel data from the group of image pixel data.

13. The method as set forth in claim 12 wherein the step of retrieving includes addressing each of the plurality of random access memories, by the processor, over a separate respective multi-bit column address line and respective multi-bit row address line.

14. The method as set forth in claim 13 further comprising transmitting an acquired image pixel data signal to each of the plurality of random access memories over a plurality of respective camera data lines, and performing at least two different preprocess operations to at least two respective image pixel data signals on at least two corresponding camera data lines, whereby image pixel data stored in at least two corresponding random access memories connected to the two camera data lines comprise different versions of the image pixel data.

\* \* \* \* \*